US012034836B1

(12) United States Patent
Stapleton

(10) Patent No.: US 12,034,836 B1
(45) Date of Patent: Jul. 9, 2024

(54) SYSTEMS AND METHODS FOR HARDWARE SECURITY MODULE COMMUNICATION MANAGEMENT

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 203 days.

(21) Appl. No.: 17/810,236

(22) Filed: Jun. 30, 2022

(51) Int. Cl.
*H04L 9/08* (2006.01)
*G06F 21/72* (2013.01)
*H04L 9/14* (2006.01)
*H04L 9/40* (2022.01)

(52) U.S. Cl.
CPC ............ *H04L 9/0819* (2013.01); *G06F 21/72* (2013.01); *H04L 9/0852* (2013.01); *H04L 9/0869* (2013.01); *H04L 9/14* (2013.01); *H04L 9/0816* (2013.01); *H04L 9/0827* (2013.01); *H04L 9/0833* (2013.01); *H04L 63/062* (2013.01)

(58) Field of Classification Search
CPC ... H04L 9/0819; H04L 9/0852; H04L 9/0869; H04L 9/14; H04L 9/0816; H04L 9/0827; H04L 9/0833; H04L 9/0838; H04L 63/06; H04L 63/061; H04L 63/065; G06F 21/72
See application file for complete search history.

(56) References Cited

U.S. PATENT DOCUMENTS

| | | | | |
|---|---|---|---|---|
| 7,975,140 B2 * | 7/2011 | Fedyk | ................... | H04L 63/065 380/279 |
| 9,660,970 B1 * | 5/2017 | Rubin | ................... | H04L 9/0891 |
| 9,692,595 B2 * | 6/2017 | Lowans | ................. | H04L 9/0858 |
| 10,305,686 B2 * | 5/2019 | Albrecht | ............... | H04L 63/065 |
| 11,082,218 B2 | 8/2021 | Nix | | |
| 2020/0274701 A1 * | 8/2020 | Yuan | ..................... | H04L 9/0841 |
| 2022/0029801 A1 * | 1/2022 | Velagapalli | ........... | H04L 9/0894 |
| 2024/0073004 A1 * | 2/2024 | Burns | ................... | H04L 9/0861 |

OTHER PUBLICATIONS

Hojoong Park, et al., Key Derivation Functions Using the Dual Key Agreement Based on QKD and RSA Cryptosystem, The Journal of Korean Institute of Communications and Information Sciences '16-04 vol. 41 No. 04, http://dx.doi.org/10.7840/kics.2016.41.4. 479.
Jia Xu, et al., Practical Quantum-Safe Stateful Hybrid Key Exchange Protocol, Published 2020.

* cited by examiner

*Primary Examiner* — Shaqueal D Wade-Wright
(74) *Attorney, Agent, or Firm* — K&L Gates LLP

(57) ABSTRACT

Systems, apparatuses, methods, and computer program products are disclosed for hardware security module communication management. An example method includes deriving, by a first HSM, a first cryptographic key based on an initial key and a first set of seed bits. The method also includes receiving a message comprising a second cryptographic key from a key exchange management device, wherein the second cryptographic key is associated with a second HSM. The method also includes deriving, a third cryptographic key based on the first cryptographic key and the second cryptographic key, wherein deriving the third cryptographic key establishes secure communication between the first HSM and the second HSM based on the second HSM having also derived the third cryptographic key. The method also includes performing, a first cryptographic data protection action using the third cryptographic key.

20 Claims, 11 Drawing Sheets

SYSTEMS AND METHODS FOR HARDWARE SECURITY MODULE COMMUNICATION MANAGEMENT

BACKGROUND

Many service providers host various cloud-based services which users may leverage to fulfill various needs. For example, some service providers may offer cloud-based hardware security modules (HSMs) which allow users to generate and manage cryptographic keys for various applications. However, different service providers implement cloud-based HSM solutions differently, making it difficult for users to migrate existing cryptographic keys from HSMs of one service provider to HSMs of another service provider.

BRIEF SUMMARY

A hardware security module (HSM) is a physical, tamper-resistant computing device (also referred to as an appliance) which safeguards and manages digital cryptographic keys, performs cryptographic actions such as encryption, decryption, and handles other cryptographic functions. HSMs may come in various forms. For example, an HSM may be a standalone appliance (e.g., a device that may attach directly to a computer or server.) In some instances, an HSM may be hardware that is built into a server (e.g., a plug-in card). In other instances, an HSM may be an appliance configured to be positioned into a rack (e.g., a device that may connect to a network via Ethernet cable). Due to the critical role HSMs play in securing applications and infrastructure, HSMs are typically certified to industry recognized standards, such as Federal Information Processing Standards (FIPS). For example, a physical HSM may be certified as FIPS 140-3 Level 3 or higher. FIPS 140-3 Level 3 includes requirements for physical tamper-resistance, identity-based authentication, and for a physical or logical separation between the interfaces by which critical security parameters enter and leave the HSM.

As mentioned above, implementations of cloud-based HSM solutions differ between service providers and fail to efficiently interoperate with each other. For example, service providers (e.g., cloud service providers) may each implement different key management and/or key exchange protocols, making it difficult for users to efficiently migrate applications between cloud environments managed by different service providers. In other words, users having an application deployed which utilizes HSMs in a first cloud environment managed by a first service provider may not be able to migrate and use the same cryptographic keys for their application when deployed to other cloud environments managed by other service providers. To further compound this issue, some service providers may even regionalize their managed HSMs, such that users may not be able to use the same cryptographic key for their applications in different regions (e.g., and east region and a west region), even though the HSMs are managed by the same service provider.

Systems, apparatuses, methods, and computer program products are disclosed herein for HSM communication management. Embodiments herein leverage a cloud infrastructure-agnostic key exchange management device and true quantum random number generation to provide a more efficient and secure process for managing the ability of groups of HSMs to securely communicate and share cryptographic keys, even in circumstances in which various HSMs of the group are hosted in different cloud environments by different service providers (which may host HSMs from different manufacturers and/or of differing models. Embodiments herein avoid the interoperability issues seen in traditional cloud-based HSM implementations and provide an effective and efficient means for sharing keys between various HSMs which may be hosted by different service providers, located in different regions, or otherwise implement different key exchange protocols and/or cryptography algorithms.

In one example embodiment, a method is provided for HSM communication management. The method includes deriving, by key derivation circuitry of a first HSM, a first cryptographic key based on an initial key and a first set of seed bits, wherein deriving the first cryptographic key establishes a first communication group comprising the first HSM and a second HSM based on the second HSM having also derived the first cryptographic key. The method also includes receiving, by communications hardware of the first HSM, a secure message comprising a second cryptographic key from a key exchange management device, wherein the second cryptographic key is associated with a second communication group comprising a third HSM and a fourth HSM. The method also includes deriving, by key derivation circuitry of the first HSM, a third cryptographic key based on the first cryptographic key and the second cryptographic key, wherein deriving the third cryptographic key establishes a third communication group comprising the first HSM, the second HSM, the third HSM, and the fourth HSM based on the second HSM, the third HSM, and the fourth HSM having also derived the third cryptographic key. The method also includes performing, by data protection circuitry of the first HSM, a first cryptographic data protection action using the third cryptographic key, wherein the first cryptographic data protection action facilitates secure communication between HSMs of the third communication group.

In another example embodiment, an apparatus is provided for HSM communication management. The apparatus includes key derivation circuitry of a first HSM configured to derive a first cryptographic key based on an initial key and a first set of seed bits, wherein deriving the first cryptographic key establishes a first communication group comprising the first HSM and a second HSM based on the second HSM having also derived the first cryptographic key. The apparatus also includes communications hardware of the first HSM configured to receive a secure message comprising a second cryptographic key from a key exchange management device, wherein the second cryptographic key is associated with a second communication group comprising a third HSM and a fourth HSM. The key derivation circuitry is further configured to derive a third cryptographic key based on the first cryptographic key and the second cryptographic key, wherein deriving the third cryptographic key establishes a third communication group comprising the first HSM, the second HSM, the third HSM, and the fourth HSM based on the second HSM, the third HSM, and the fourth HSM having also derived the third cryptographic key. The apparatus also comprises data protection circuitry of the first HSM configured to perform a first cryptographic data protection action using the third cryptographic key, wherein the first cryptographic data protection action facilitates secure communication between HSMs of the third communication group.

In another example embodiment, a method is provided for HSM communication management. The method includes receiving, by communications hardware of a key exchange management device, a first message from a first HSM in a first communication group, wherein the first message comprises a first cryptographic key. The method also includes identifying, by message circuitry of the key exchange management device, a second HSM in a second communication group based on the first message. The method also includes generating, by message circuitry of the key exchange management device, a secure message comprising the first cryptographic key. The method also includes causing transmission, by the communications hardware of the key exchange management device, of the secure message to the second HSM.

In another example embodiment, an apparatus is provided for HSM communication management. The apparatus includes communications hardware configured to receive a first message from a first HSM in a first communication group, wherein the first message comprises a first cryptographic key. The apparatus also includes message circuitry configured to identify a second HSM in a second communication group based on the first message, and generate a secure message comprising the first cryptographic key. The communications hardware is further configured to cause transmission of the secure message to the second HSM.

In another example embodiment, a method is provided for HSM communication management. The method includes deriving, by key derivation circuitry of a first HSM, a first cryptographic key based on an initial key and a first set of seed bits, wherein the first HSM is hosted by a first service provider. The method also includes receiving, by communications hardware of the first HSM, a message comprising a second cryptographic key from a key exchange management device, wherein the second cryptographic key is associated with a second HSM hosted by a second service provider different from the first service provider. The method also includes deriving, by key derivation circuitry of the first HSM, a third cryptographic key based on the first cryptographic key and the second cryptographic key, wherein deriving the third cryptographic key establishes secure communication between the first HSM and the second HSM based on the second HSM having also derived the third cryptographic key. The method also includes performing, by data protection circuitry of the first HSM, a first cryptographic data protection action using the third cryptographic key, wherein the first cryptographic data protection action facilitates the secure communication between the first HSM and the second HSM.

In another example embodiment, an apparatus is provided for HSM communication management. The apparatus includes key derivation of a first HSM configured to derive a first cryptographic key based on an initial key and a first set of seed bits, wherein the first HSM is hosted by a first service provider. The apparatus also includes communications hardware of the first HSM configured to receive a message comprising a second cryptographic key from a key exchange management device, wherein the second cryptographic key is associated with a second HSM hosted by a second service provider different from the first service provider. The key derivation circuitry of the first HSM is further configured to derive a third cryptographic key based on the first cryptographic key and the second cryptographic key, wherein deriving the third cryptographic key establishes secure communication between the first HSM and the second HSM based on the second HSM having also derived the third cryptographic key. The apparatus also includes data protection circuitry of the first HSM configured to perform a first cryptographic data protection action using the third cryptographic key, wherein the first cryptographic data protection action facilitates the secure communication between the first HSM and the second HSM.

In another example embodiment, a method is provided for HSM communication management. The method includes receiving, by communications hardware of a key exchange management device, a first message from a first HSM hosted by a first service provider, wherein the first message comprises a first cryptographic key. The method also includes identifying, by message circuitry of the key exchange management device, a second HSM based on the first message, wherein the second HSM is hosted by a second service provider different from the first service provider. The method also includes generating, by message circuitry of the key exchange management device, a secure message comprising the first cryptographic key. The method also includes causing transmission, by the communications hardware of the key exchange management device, of the secure message to the second HSM.

In another example embodiment, an apparatus is provided for HSM communication management. The apparatus includes communications hardware configured to receive a first message from a first HSM hosted by a first service provider, wherein the first message comprises a first cryptographic key. The apparatus also includes message circuitry configured to identify a second HSM based on the first message, wherein the second HSM is hosted by a second service provider different from the first service provider, and generate a secure message comprising the first cryptographic key. The communications hardware is further configured to cause transmission of the secure message to the second HSM.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Methods, apparatuses, systems, and computer program products are described herein that provide for HSM communication management. As mentioned above, disparate cloud environments hosting various HSMs deploy and manage their HSMs differently. In this regard, different cloud environments may distribute, manage, and exchange keys according to different algorithms, protocols, and/or the like such that the cloud environments fail to interoperate with each other. This isolated nature of managing HSMs burdens users and/or organizations seeking to deploy an application using HSMs hosted by more than one cloud service provider. For instance, users may be unable to migrate and utilize the same cryptographic keys under different cloud service providers.

To solve these existing issues, example embodiments described herein provide HSM management techniques that improve upon traditional processes for managing cryptographic keys and communication for groups of HSMs, as illustrated at a high level by FIGS. 1A-D.

Figure 1A:
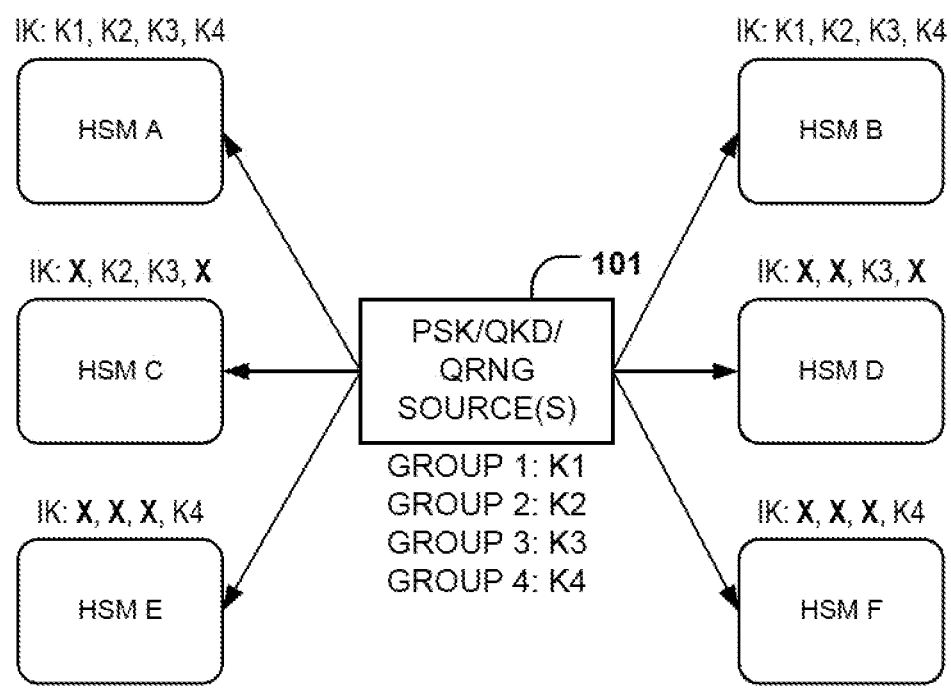
FIG. 1A illustrates an improved method of establishing and managing secure communication between groups of HSMs in accordance with some example embodiments described herein.

FIG. 1A illustrates a plurality of HSMs which may be hosted by a single service provider or otherwise be able to interoperate with each other. In some embodiments, an initial key (IK) may first be established for, e.g., HSM A and HSM B. The IK may be distributed to HSM A and HSM B using an existing key distribution process. Some examples of key distribution processes involve distributing pre-shared keys (PSK) or distributing keys derived using quantum mechanics, one example being Quantum Key Distribution (QKD).

In a traditional QKD implementation, a QKD device (e.g., source 101) generates two streams of quantum particles (i.e., qubits), each of which may comprise entangled or non-entangled photons, and sends one stream to a first device (e.g., HSM A) and another to a second device (e.g., HSM B). Typically, one of the participants manages the QKD device, but it could be managed by a third party. HSM A and HSM B both read the received quantum particles, interpreting the same string of binary zeroes and ones. HSM A and HSM B may use a separate communications channel to statically verify that they have read and interpreted the quantum particles correctly. A device reading any photon will affect the state of that photon, so through a variety of operations, HSM A and HSM B are able to determine whether an attacker using a third device has eavesdropped on any of the transmitted photons. As a result, HSM A and HSM B are able to use only photons that were not eavesdropped on as the basis for generation of a key (e.g., an IK) known only to each other. In conventional implementations of QKD, that key can then be used for secure communications between HSM A and HSM B.

Other key distribution processes may also be used. For example, in many instances, keys are injected into devices within a Key Injection Facility (KIF), which is a physically secure room. After receipt of one or more secret keys within a KIF, a device can thereafter be shipped to remote locations where it can utilize the injected keys. To facilitate this process, such devices often include a Secure Cryptographic Device (SCD) that provides physically and logically protected cryptographic services and storage (e.g., a PIN entry device (PED) or an HSM into which the key(s) are injected. For instance, an SCD (e.g., an encryption personal identification number (PIN) pad (EPP)) may be integrated into a larger system such as an automated teller machine (ATM) or point-of-sale (POS) terminal, and after injection of one or more keys into the integrated SCD, the larger system may thereafter be deployed to its ultimate destination for use.

Another common method for distributing keys uses a SCD as a portable Key Loading Device (KLD), which is a mobile device that can physically transport and inject keys outside of a key injection facility (KIF). Keys are prepared and transferred from a secure cryptographic device (SCD) to the KLD within the KIF. The KLD is then physically transported to devices (e.g., HSMs) and the prepared keys are transferred to the SCD of the remote device. Thus, secure communication between two HSMs may be established.

Regardless of the specific key distribution process that is used to establish the IK, once HSM A and HSM B have obtained the IK, HSM A and HSM B may also receive a first set of seed bits (e.g., from a source 101). The first set of seed bits may comprise a truly random number that has been generated using a quantum random number generator (QRNG). In this regard, the first set of seed bits may comprise a truly random string of bits (e.g., a string of binary zeroes and ones) derived using a quantum source.

HSM A and HSM B may then each use an agreed-upon key derivation function (KDF) to derive a first cryptographic key (K1) using the IK and the first set of seed bits as inputs to the KDF. By deriving K1, HSM A and HSM B have established a first communication group (Group 1) comprising HSM A and HSM B, and can use K1 to securely communicate. For example, data transmitted between HSM A and HSM B can be encrypted and decrypted using K1.

Sometime later, HSM A and HSM B may need to securely communicate with another HSM, e.g., HSM C. To do so, HSM C may receive the same IK in a secure manner (e.g., provided over a secure protocol such as Transport Layer Security (TLS) or the like by either HSM A or HSM B). HSM A, HSM B, and HSM C may then all receive a set of seed bits (e.g., a new truly random number from a QRNG). HSM A, HSM B, and HSM C use an agreed-upon KDF to derive a second symmetric key (K2) using the IK and the second set of seed bits as inputs to the KDF. By deriving K2, HSM A, HSM B, and HSM C have established a second communication group (Group 2) comprising HSM A, HSM B, and HSM C, and can use K2 to securely communicate. All three HSMs may agree to use K2 or derive other keys. Additionally, HSM A and HSM B may also retain K1, such that the first communication group remains intact and HSM A and HSM B can still securely communicate with each other using K1 without exposing communications to HSM C.

Eventually, the three HSMs (HSM A, HSM B, and HSM C) may need to add another HSM (HSM D) to a group. HSM D may then receive the same IK in a secure manner. HSM A, HSM B, HSM C, and HSM D may then all receive a third set of seed bits from a QRNG and use an agreed-upon KDF to derive a third key (K3) using the IK and the third set of seed bits as inputs to the KDF. In this regard, a third communication group (Group 3) is established with a key (K3) shared by all four participating HSMs. Note that HSM A and HSM B still retain Group 1, and HSM A, HSM B, and HSM C still retain Group 2.

At some point, HSM A and HSM B may need to establish a new group with HSM E and HSM F, but without HSM C and HSM D. HSM E and HSM F may then receive the same IK in a secure manner. HSM A, HSM B, HSM E, and HSM F may then all receive a fourth set of seed bits from a QRNG and use an agreed-upon KDF to derive a fourth key (K4) using the IK and the third set of seed bits as inputs to the KDF, but neither HSM C or HSM D receive the fourth set of seed bits. In this regard, a fourth communication group (Group 4) is established with a key (K4) shared by HSM A, HSM B, HSM E, and HSM F, but without HSM B and HSM C.

This process can be repeated N-times, for hundreds, thousands, or millions of groups and keys. Further, at any time the group members can agree to stop using a specific key to disband a group, or collectively acquire a new random number to re-establish a new key for the same group. Each time a new member needs to be added to an existing group, the group collectively receives a new random number to establish a new key for essentially a new group. Each time a member needs to be removed from a group, the other members may acquire a new random number to establish a new key for essentially a new group (or, in some embodiments, discontinue use of the group key and revert to an existing key).

Figure 1B:
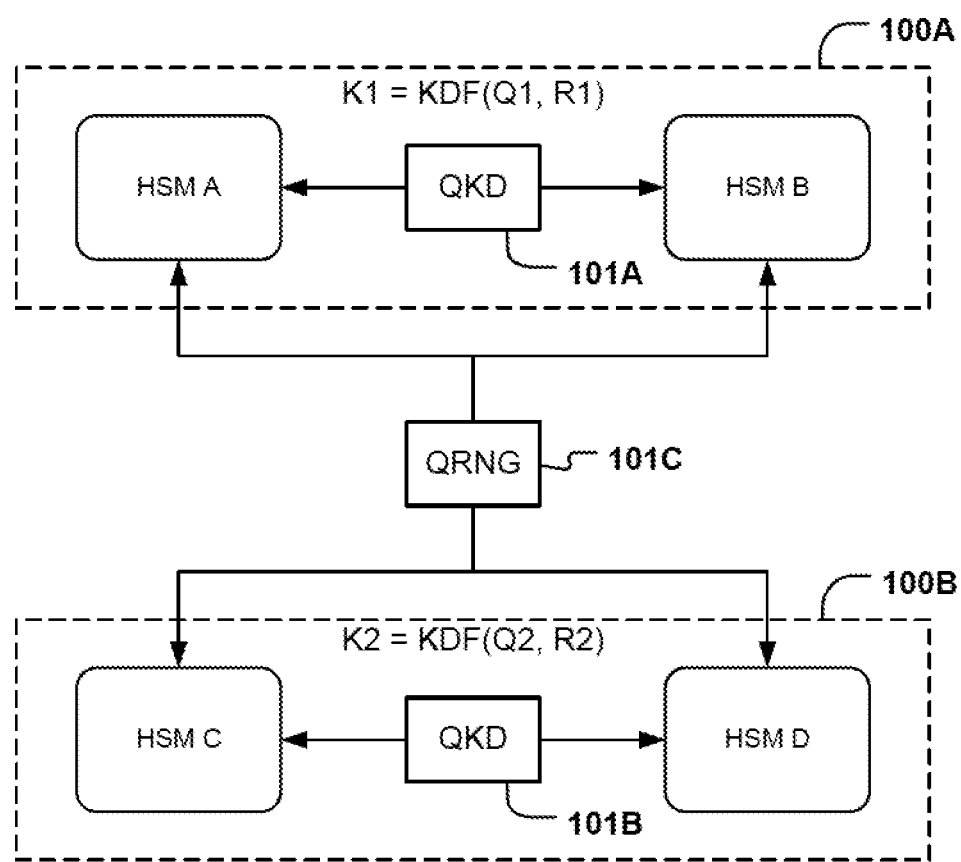
FIG. 1B illustrates an example representation of quantum-based key derivation among HSMs hosted by different cloud service providers, in accordance with some example embodiments described herein.
Figure 1C:
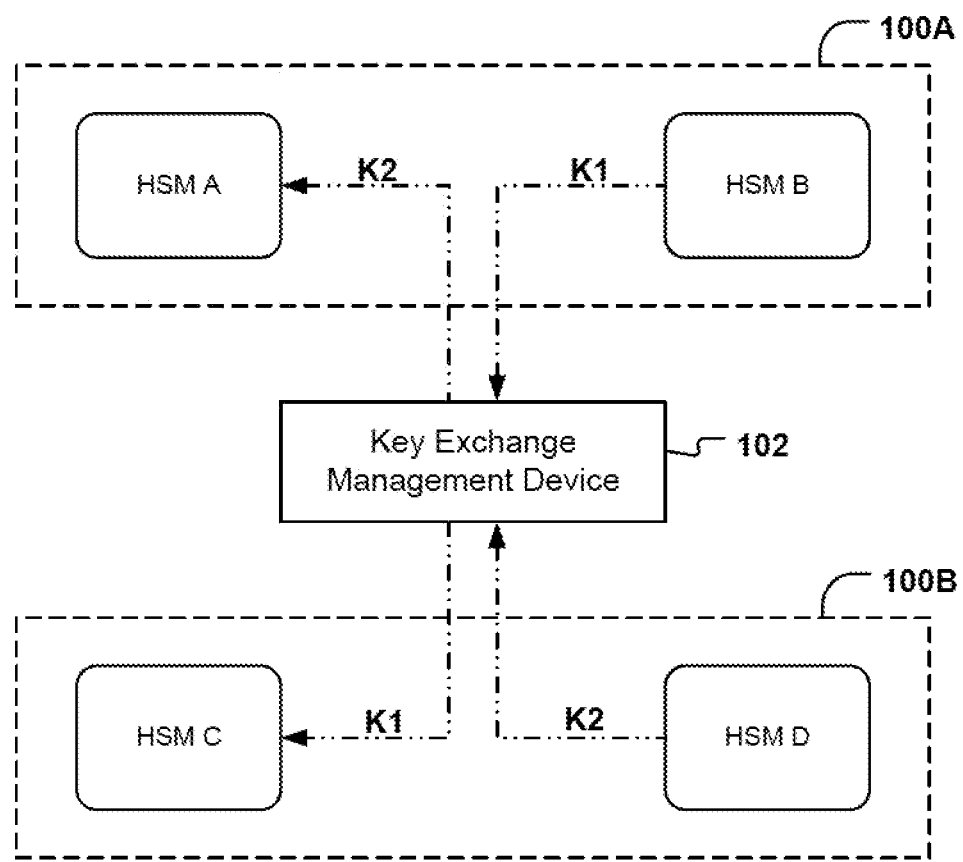
FIG. 1C illustrates an example representation of how a key exchange management device may exchange keys between HSMs, in accordance with some example embodiments described herein.
Figure 1D:
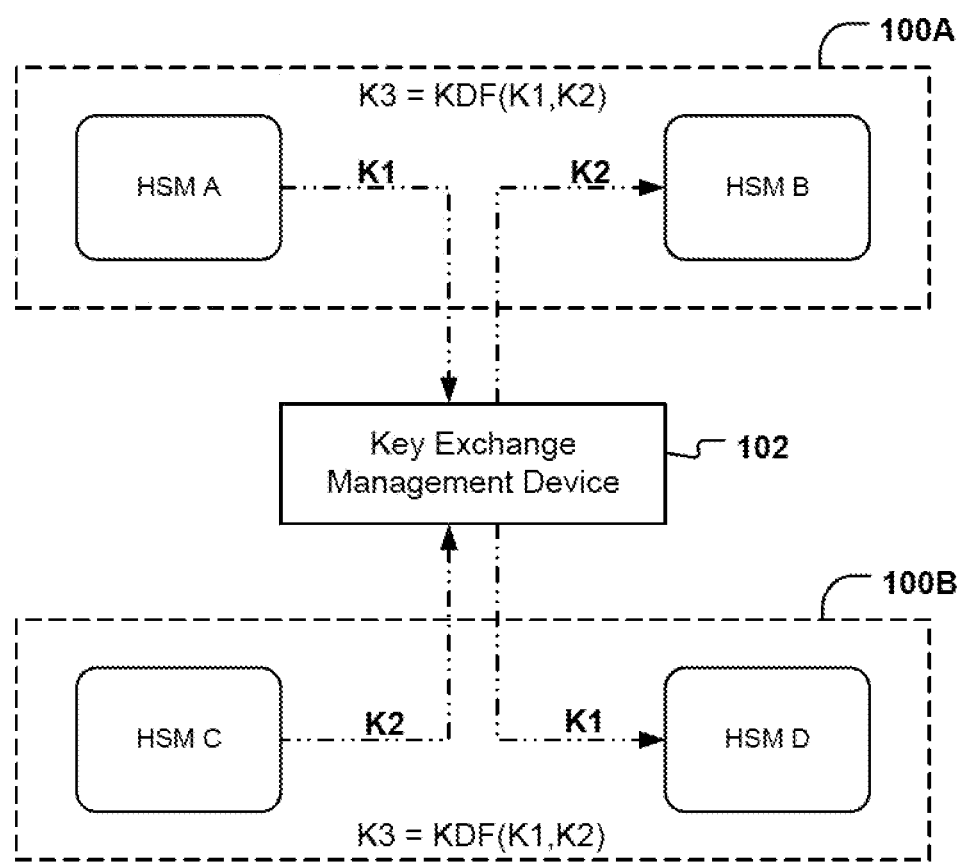
FIG. 1D illustrates an example representation of how a key exchange management device may exchange keys between HSMs, in accordance with some example embodiments described herein.

As noted above, HSMs hosted by different service providers may not easily be able to exchange data (e.g., keys) with each other due to the different nature of their respective cloud environments. For example, different key exchange protocols and the like may be implemented in different cloud environments. Turning to FIG. 1B-1D, example representations of embodiments that solve the existing issue of HSM interoperability are shown.

As shown in FIG. 1B, a first cloud environment 100A may include several HSMs (e.g., HSM A and HSM B) that are hosted by a first service provider. A second cloud environment 100B may include several HSMs (e.g., HSM C and HSM D) that are hosted by a second service provider. Each cloud environment may implement QKD to distribute keys to their respective HSMs, however the exact method of QKD may differ between cloud service providers. For example, cloud environment 100A may implement a first method of QKD 101A and cloud environment 100B may implement a second method of QKD 101B. Regardless of the method of QKD, the HSMs may receive a quantum particles set. For instance, HSM A and HSM B may receive a quantum particles set Q1. Likewise, HSM C and HSM D may receive a second quantum particles set Q2.

In some embodiments, the HSMs of each cloud environment may receive a set of seed bits in order to derive a key to use for communication within the cloud environment. For example, HSM A and HSM B may each receive a first set of seed bits R1 from a QRNG 101C. Likewise, HSM C and HSM D may receive a second set of seed bits R2 from the same or a different QRNG. HSM A and B may then use Q1 and R1 as inputs to a KDF to derive a key K1. For example, HSM A and B may measure their respective quantum particles sets to derive an initial key, and use the initial key and R1 as inputs to the KDF to derive K1. Similarly, HSM C and D may then use Q2 and R2 as inputs to a KDF to derive a key K2. For example, HSM C and D may measure their respective quantum particles sets to derive an initial key, and use the initial key and R2 as inputs to the KDF to derive K2.

Turning to FIG. 1C, example embodiments may utilize a key exchange management device 102 to allow for key establishment among multiple HSMs hosted by different service providers. In some embodiments, the key exchange management device 102 may be hosted or otherwise managed by a third-party (e.g., a party separate from the service providers managing cloud environment 100A and cloud environment 100B). As shown, for example, HSM B may cause transmission of a message containing K1 to the key exchange management device 102 (e.g., using a secure communication protocol such as TLS or the like). The message may also indicate one or more HSMs to which K1 is to be transmitted. For example, as shown in FIG. 1C, the message may indicate that HSM C is to receive K1.

In some embodiments, the key exchange management device 102 may generate a secure message comprising K1 and cause transmission of the secure message to HSM C. The secure message may be a Cryptographic Message Syntax (CMS) object. CMS is the Internet Engineering Task Force (IETF) standard for cryptographically protected messages. CMS can be used by various cryptographic schemes and protocols to digitally sign, digest, authenticate or encrypt any form of digital data. In this regard, CMS objects can be used to communicate data between HSMs that implement different key exchange and/or management protocols. As shown in FIG. 1C, HSM C may then obtain K1 via the secure message transmitted from the key exchange management device 102. Similarly, HSM D may cause transmission (e.g., using a secure communication protocol such as TLS or the like) of a message containing K2 to the key exchange management device 102. The key exchange management device 102 may then generate a secure message (e.g., a CMS object) comprising K2 and cause transmission of the secure message to HSM A. Likewise, as shown in FIG. 1D, HSM A may cause transmission of a message containing K1 to the key exchange management device 102. The key exchange management device 102 may then generate a secure message comprising K1 and cause transmission of the secure message to HSM D. Additionally, HSM C may cause transmission of a message containing K2 to the key exchange management device 102. The key exchange management device 102 may then generate a secure message comprising K2 and cause transmission of the secure message to HSM B.

While FIGS. 1C and 1D depict one example way of exchanging K1 and K2, it is to be appreciated that K1 and K2 may be exchanged in other manners. For example, HSM A may send a message comprising K1 and an indication of both HSM C and D to the key exchange management device 102. The key exchange management device 102 may then generate a secure message comprising K1 and cause transmission of the secure message to both HSM C and D. Similarly, HSM C may send a message comprising K2 and an indication of both HSM A and B to the key exchange management device 102. The key exchange management device 102 may then generate a secure message comprising K2 and cause transmission of the secure message to both HSM A and B.

Once HSM A and B have obtained K2 and HSM C and HSM D have obtained K1, a new key K3 may be derived by each of the HSMs using K1 and K2 as inputs to an agreed-upon KDF. Thus, all four HSMs now possess K3 even though the HSMs are hosted by different service providers in different cloud environments. By all HSMs sharing K3, for example, a user may efficiently migrate an application from one cloud environment to another without having to manage multiple keys for the application, thus reducing application implementation complexity. Further, the HSMs may continue to use K3 and efficiently derive new keys using a QRNG (e.g., using the method shown in FIG. 1A).

Accordingly, the present disclosure sets forth systems, methods, and apparatuses that provide HSM communication management and solve existing issues that arise from differently managed cloud-based HSMs. There are many advantages of these and other embodiments described herein. For instance, by only needing to receive sufficient seed bits to generate a new key, embodiments herein can operate within extremely low bandwidth environments or during intermittent connections. Additionally, security of communications between devices is enhanced, in that while the generation of new keys is streamlined and more efficient, additional complexity is added by way of the KDF and a truly random number, making it more difficult for bad actors to gain knowledge of the key (e.g., a bad actor would be required not only to know the two keys, but also the exact type of KDF used as well).

Although a high level explanation of the operations of example embodiments has been provided above, specific details regarding the configuration of such example embodiments are provided below.

System Architecture

Figure 2:
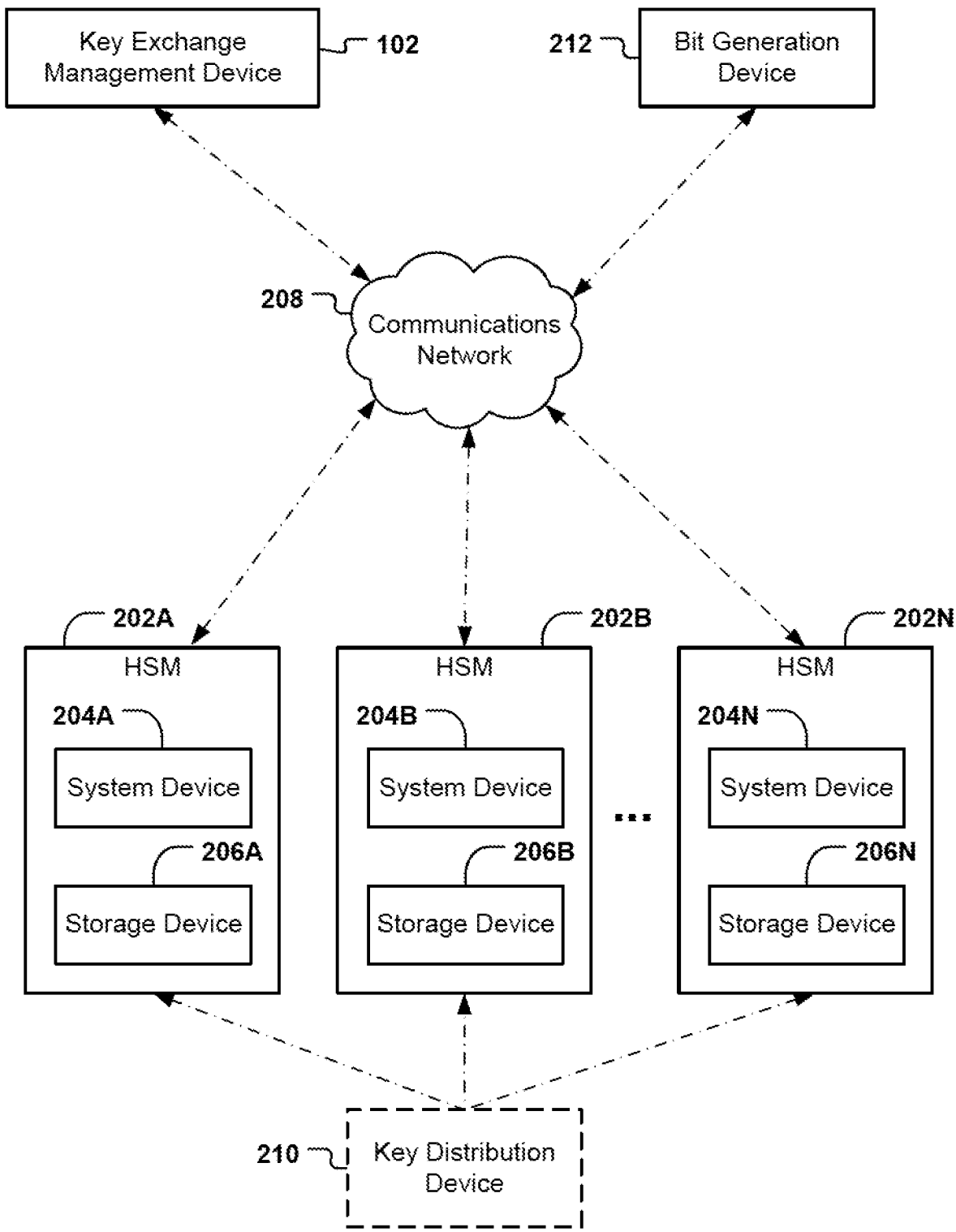
FIG. 2 illustrates a system in which some example embodiments may be used.

Example embodiments described herein may be implemented using any of a variety of HSMs, computing devices, or servers. To this end, FIG. 2 illustrates an example environment within which various embodiments may operate. As illustrated, the environment may include a first HSM 202A which may include a system device 204A in communication with a storage device 206A. The environment may also include multiple other HSMs, such as a HSM 202B, which may also include a system device 204B in communication with a storage device 206B, up to HSM 202N, which may include a system device 204N in communication with a storage device 206N. In some embodiments, various HSMs of the HSMs 202A-N may be hosted by different service providers and implemented in different cloud environments. Although system devices 204A-N and storage devices 206A-N are described in singular form, HSMs in some embodiments may utilize more than one system device and/or more than one storage device. Additionally, in some embodiments, the HSMs 202A-N may not require a storage device at all. Whatever the implementation, the HSMs 202A-N, and their constituent system device(s) 204A-N and/or storage device(s) 206A-N may receive and/or transmit information via communications network 208 (e.g., the Internet) with any number of other devices, such as one or more additional HSMs (not shown), a key exchange management device 102, a key distribution device 210, and/or a bit generation device 212.

HSMs 204A-N may be implemented as cloud-based HSMs, which may or may not be physically proximate to other components of their respective HSMs. Furthermore, some components of HSMs 204A-N may be physically proximate to the other components of their respective HSMs while other components are not. System devices 204A-N may receive, process, generate, and transmit data, signals, and electronic information to facilitate the operations of their respective HSMs. Particular components of system devices 204A-N are described in greater detail below with reference to apparatus 300 in connection with FIG. 3.

Storage devices 206A-N may comprise distinct components from system devices 204A-N, or may comprise an element of system devices 204A-N (e.g., memory 304, as described below in connection with FIG. 3). Storage devices 206A-N may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 208). Storage devices 206A-N may host the software executed to operate their respective HSMs. Storage devices 206A-N may store information relied upon during operation of the HSMs, such as various sets of seed bits, key derivation functions, and/or other information that may be used by the computing devices, data to be analyzed, or the like. In addition, storage devices 206A-N may store control signals, device characteristics, and access credentials enabling interaction between the HSMs and one or more of the key exchange management device 102, the bit generation device 212, and key distribution device 210.

The key distribution device 210 may be embodied by various storage devices known in the art. For instance, the key distribution device 210 may comprise a key loader device (KLD) used to load cryptographic keys into electronic devices. In some embodiments, the key distribution device 210 may comprise a mobile quantum key distribution (MQKD) device, as disclosed in U.S. patent application Ser. No. 17/451,800, the entirety of which is incorporated herein by reference. In some embodiments, the key distribution device 210 may include one or more connection ports or the like suitable to transmit quantum particles (e.g., in embodiments in which QKD serves as the initial key distribution process). For example, the key distribution device 210 may comprise a connection port for a fiber-optic cable and/or a laser port. More broadly, a key distribution device 210 may include connection ports of one kind or another that are suitable to inject data (e.g., quantum particles, cryptographic keys, and/or the like) into HSMs 202A-N.

The bit generation device 212 may be embodied by various computing devices known in the art. Though a single bit generation device 212 is shown in FIG. 2, the HSMs 202A-N may be in communication with and/or receive data from multiple bit generation devices. The bit generation device 212 may be capable of generating a set of seed bits (e.g., a random or truly random number) and causing transmission of the set of seed bits to various HSMs (e.g., HSMs 202A-N). In some embodiments, the bit generation device 212 may cause transmission of the set of seed bits over the communications network 208 via a cryptographic protocol (e.g., via a Transport Layer Security (TLS) connection or the like). To generate a set of seed bits, the bit generation device 212 may comprise random number generator circuitry (further described below in connection with FIG. 4), which may comprise a quantum random number generator (QRNG). In some embodiments, the bit generation device 212 may be part of a quantum random number generator entity (e.g., an organization or the like) managed by third-party service provider that provides quantum random number generation.

Example Implementing Apparatuses

Figure 3:
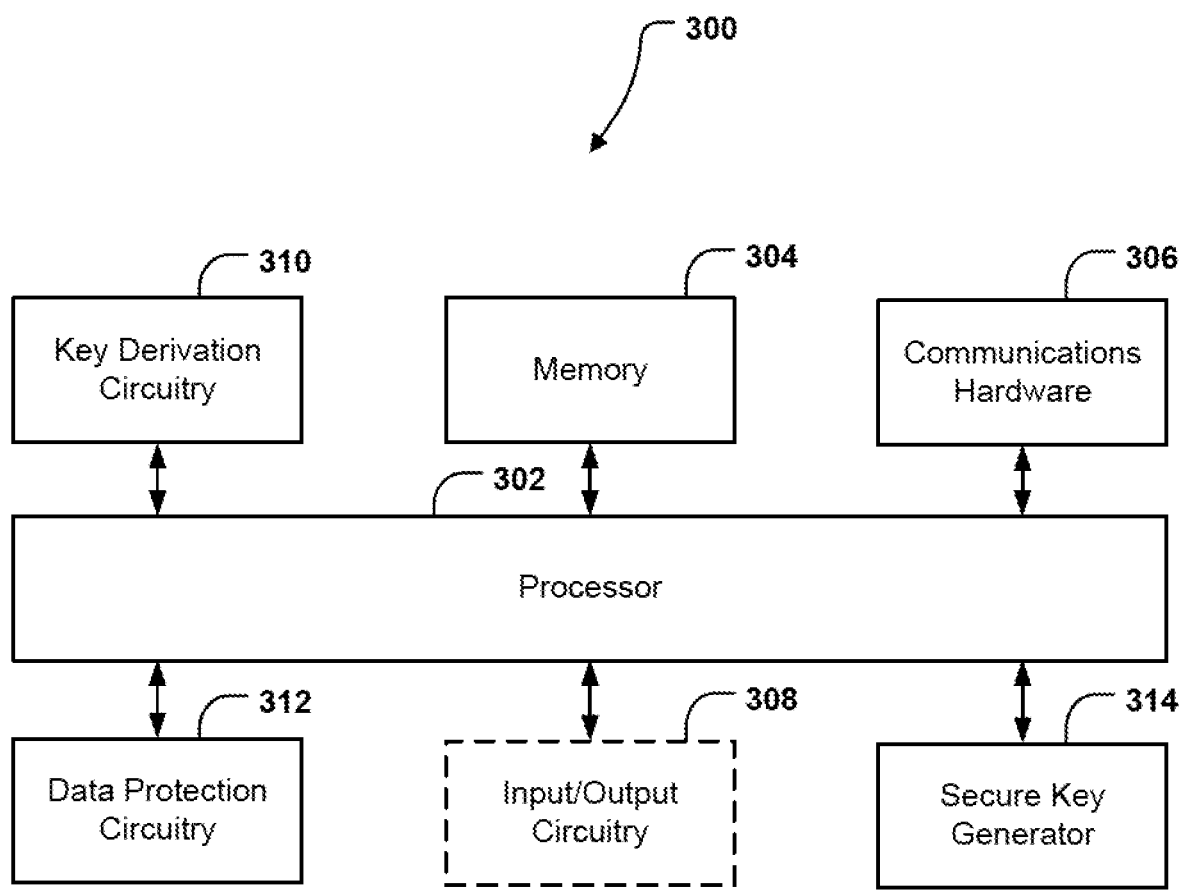
FIG. 3 illustrates a schematic block diagram of example circuitry embodying a device that may perform various operations in accordance with some example embodiments described herein.

System device 204A-N (described previously with reference to FIG. 2) may each be embodied by one or more HSMs, shown as apparatus 300 in FIG. 3. As illustrated in FIG. 3, the apparatus 300 may include processor 302, memory 304, communications hardware 306, input-output circuitry 308, key derivation circuitry 310, data protection circuitry 312, and a secure key generator 314, each of which will be described in greater detail below. While the various components are only illustrated in FIG. 3 as being connected with processor 302, it will be understood that the apparatus 300 may further comprises a bus (not expressly shown in FIG. 3) for passing information amongst any combination of the various components of the apparatus 300. The apparatus 300 may be configured to execute various operations described above in connection with FIGS. 1A-2 and below in connection with FIGS. 6-8.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device (e.g., storage devices 206A-N), as illustrated in FIG. 2). In some cases, the processor may be configured to execute hard-coded functionality. As such, whether configured by hardware or software methods, or by a combination of hardware with software, the processor 302 represent an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device (e.g., another HSM), circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processor for causing transmission of such signals to a network or for handling receipt of signals received from a network. In some embodiments, the communications hardware 306 may include, for example, interfaces such as one or more ports (e.g., a laser port, a fiber-optic cable port, and/or the like) for enabling communications with other devices.

The apparatus 300 may optionally include input-output circuitry 308 configured to provide output to a user and, in some embodiments, to receive an indication of user input. It will be noted that some embodiments will not include input-output circuitry 308, in which case user input may be received via a separate device such as a separate client device or the like. The input-output circuitry 308 may comprise a user interface, such as a display, and may further comprise the components that govern use of the user interface, such as a web browser, mobile application, dedicated client device, or the like. In some embodiments, the input-output circuitry 308 may include a keyboard, a mouse, a touch screen, touch areas, soft keys, a microphone, a speaker, and/or other input/output mechanisms. The input-output circuitry 308 may utilize the processor 302 to control one or more functions of one or more of these user interface elements through software instructions (e.g., application software and/or system software, such as firmware) stored on a memory (e.g., memory 304) accessible to the processor 302.

In addition, the apparatus 300 further comprises key derivation circuitry 310 that derives cryptographic keys (e.g., using and one or more keys and/or sets of seed bits). The key derivation circuitry 310 may utilize processor 302, memory 304, or any other hardware component included in the apparatus 300 to perform these operations, as described in connection with FIGS. 6-8 below. The key derivation circuitry 310 may further utilize communications hardware 306 to gather data from a variety of sources (e.g., key exchange management device 102, bit generation device 212, and/or key distribution device 210, as shown in FIG. 2), may utilize input-output circuitry 308 to receive data from a user, and in some embodiments may utilize processor 302 and/or memory 304 to derive cryptographic keys via one or more KDFs.

In addition, the apparatus 300 further comprises data protection circuitry 312 that performs cryptographic data protection actions using cryptographic keys. The data protection circuitry 312 may utilize processor 302, memory 304, or any other hardware component included in the apparatus 300 to perform these operations, as described in connection with FIGS. 6-8 below. The data protection circuitry 312 may further utilize communications hardware 306 to gather data from a variety of sources (e.g., other HSMs 202A-N), may utilize input-output circuitry 308 to receive data from a user, and in some embodiments may utilize processor 302 and/or memory 304 to encrypt data using a cryptographic key, decrypt encrypted data using a cryptographic key, and/or perform other cryptographic data protection actions.

In addition, the apparatus 300 also comprises a secure key generator 314 that generates a cryptographic key from a quantum particles set. The secure key generator 314 may utilize processor 302, memory 304, or any other hardware component included in the apparatus 300 to perform these operations, as described in connection with FIGS. 6-8 below. The secure key generator 314 may further utilize communications hardware 306 to gather data from a variety of sources (e.g., key distribution device 210, as shown in FIG. 2), may utilize input-output circuitry 308 to receive data from a user, and in some embodiments may utilize processor 302 and/or memory 304 to measure quantum particles of a quantum particles set and generate a secure cryptographic key based on the measurement of the quantum particles. The secure key generator 314 may be any means such as one or more devices or circuitry embodied in either hardware or a combination of hardware and software that is configured to measure quantum particles and generate secure cryptographic keys. The quantum particles may be measured to facilitate distribution of true random numbers to devices (thereby each obtaining copies of true random number sequences).

Although components 302-316 are described in part using functional language, it will be understood that the particular implementations necessarily include the use of particular hardware. It should also be understood that certain of these components 302-316 may include similar or common hardware. For example, the key derivation circuitry 310, data protection circuitry 312, and secure key generator 314 may each at times leverage use of the processor 302, memory 304, communications hardware 306, or input-output circuitry 308, such that duplicate hardware is not required to facilitate operation of these physical elements of the apparatus 300 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 300 to perform the various functions described herein.

Although the key derivation circuitry 310, data protection circuitry 312, and the secure key generator 314 may leverage processor 302, memory 304, communications hardware 306, or input-output circuitry 308 as described above, it will be understood that any of these elements of apparatus 300 may include one or more dedicated processor, specially configured field programmable gate array (FPGA), or application specific interface circuit (ASIC) to perform its corresponding functions, and may accordingly leverage processor 302 executing software stored in a memory (e.g., memory 304), or memory 304, communications hardware 306 or input-output circuitry 308 for enabling any functions not performed by special-purpose hardware elements. In all embodiments, however, it will be understood that the key derivation circuitry 310, data protection circuitry 312, and the secure key generator 314 are implemented via particular machinery designed for performing the functions described herein in connection with such elements of apparatus 300.

Figure 4:
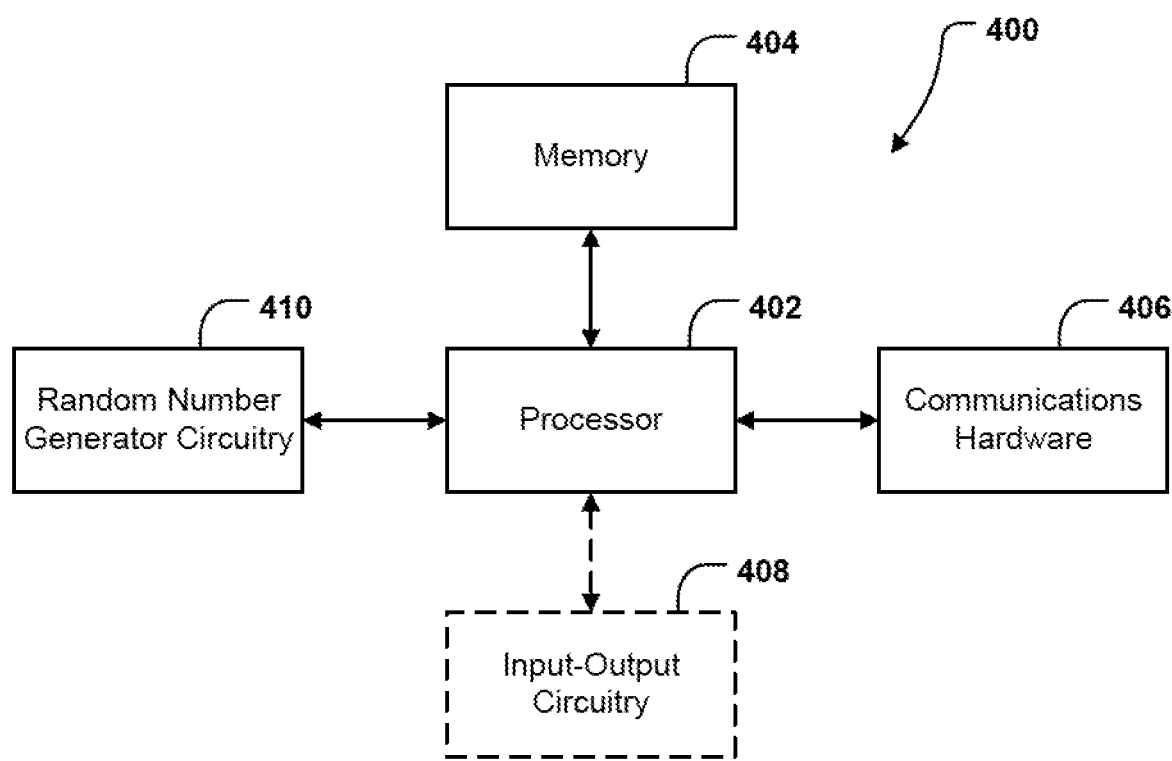
FIG. 4 illustrates a schematic block diagram of example circuitry embodying a bit generation device that may perform various operations in accordance with some example embodiments described herein.

As illustrated in FIG. 4, an apparatus 400 is shown that represents an example bit generation device 212 (e.g., as shown in FIG. 2). The apparatus 400 includes processor 402, memory 404, communications hardware 406, and may optionally include input-output circuitry 408, each of which is configured to be similar to the similarly named components described above in connection with FIG. 3. The apparatus 400 also includes random number generator circuitry 410 that generates a set of seed bits. The random number generator circuitry 410 may utilize processor 402, memory 404, or any other hardware component included in the apparatus 400 to perform these operations, as described in connection with FIGS. 6-8 below. The random number generator circuitry 410 may further utilize communications hardware 406 to gather data from a variety of sources (e.g., computing devices 202A-N), may utilize input-output circuitry 408 to receive data from a user, and in some embodiments may utilize processor 402 and/or memory 404 to generate a set of seed bits. As mentioned above, the random number generator circuitry 410 may comprise a quantum random number generator used to generate a set of seed bits (e.g., a truly random string of bits) using a quantum source.

Figure 5:
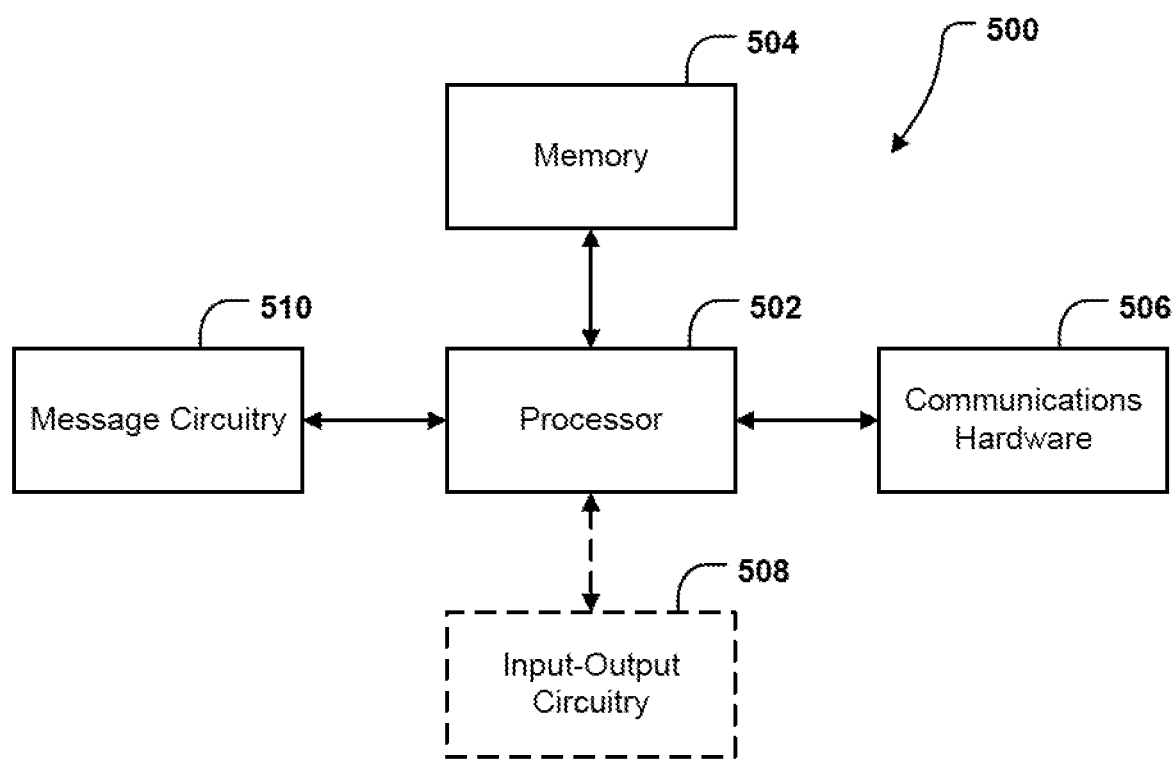
FIG. 5 illustrates a schematic block diagram of example circuitry embodying a key exchange management device that may perform various operations in accordance with some example embodiments described herein.

As illustrated in FIG. 5, an apparatus 500 is shown that represents an example key exchange management device 102 (e.g., as shown in FIG. 1C, 1D, and FIG. 2). The apparatus 500 includes processor 502, memory 504, communications hardware 506, and may optionally include input-output circuitry 508, each of which is configured to be similar to the similarly named components described above in connection with FIG. 3. The apparatus 500 also includes message circuitry 510 that generates secure messages (e.g., CMS objects as described above). The message circuitry 510 may utilize processor 502, memory 504, or any other hardware component included in the apparatus 500 to perform these operations, as described in connection with FIGS. 6-8 below. The message circuitry 510 may further utilize communications hardware 506 to gather data from a variety of sources (e.g., HSMs 202A-N), may utilize input-output circuitry 508 to receive data from a user, and in some embodiments may utilize processor 502 and/or memory 504 to generate secure messages.

In some embodiments, various components of the apparatuses 300, 400, and 500 may be hosted remotely (e.g., by one or more cloud servers) and thus need not physically reside on the corresponding apparatus 300 and 400. Thus, some or all of the functionality described herein may be provided by third party circuitry. For example, a given apparatus 300, 400, or 500 may access one or more third party circuitries via any sort of networked connection that facilitates transmission of data and electronic information between the apparatus 300 or 400 and the third party circuitries. In turn, that apparatus 300, 400, or 500 may be in remote communication with one or more of the other components describe above as comprising the apparatus 300, 400, or 500.

As will be appreciated based on this disclosure, example embodiments contemplated herein may be implemented by apparatuses 300 and 500. Furthermore, some example embodiments may take the form of a computer program product comprising software instructions stored on at least one non-transitory computer-readable storage medium (e.g., memory 304 or memory 504). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 300 as described in FIG. 3, apparatus 400 as described in FIG. 4, or apparatus 500 as described in FIG. 5 that loading the software instructions onto a computing device or apparatus produces a special-purpose machine comprising the means for implementing various functions described herein.

Having described specific components of example apparatuses 300, 400, and 500, example embodiments are described below in connection with a series of flowcharts.

Example Operations

Figure 6:
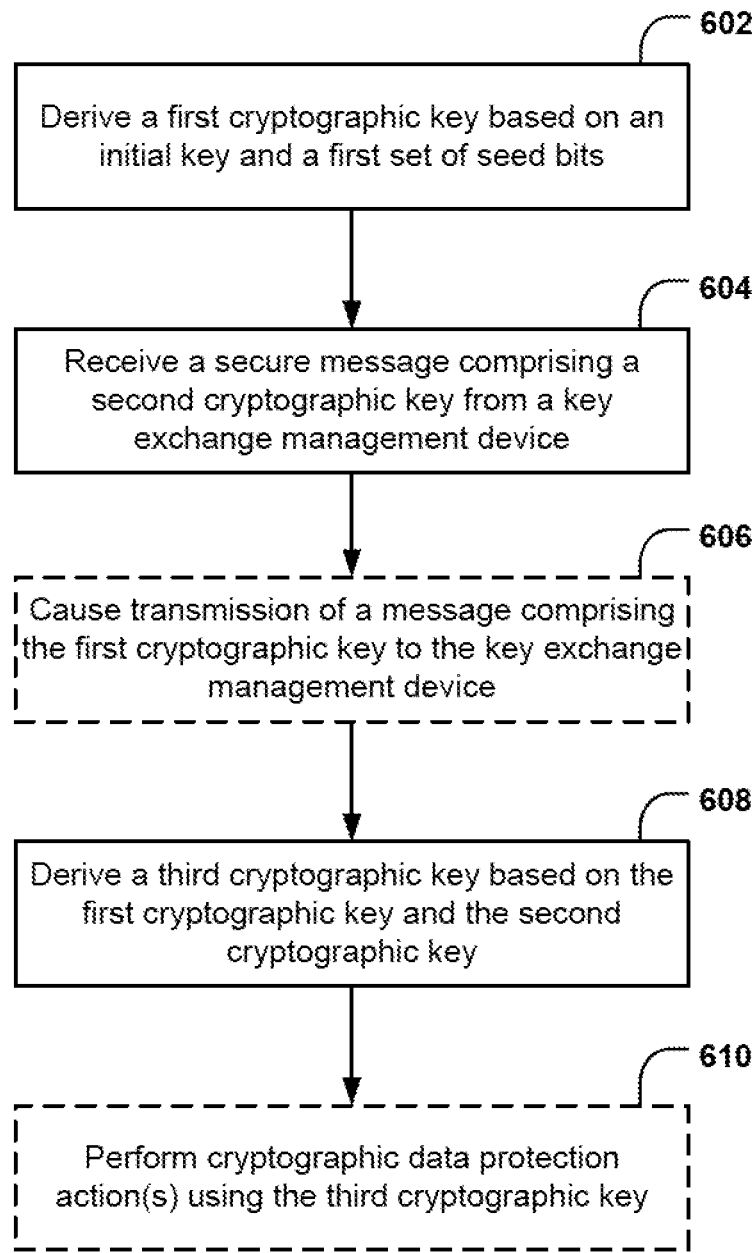
FIG. 6 illustrates an example flowchart for HSM communication management, in accordance with some example embodiments described herein.
Figure 7:
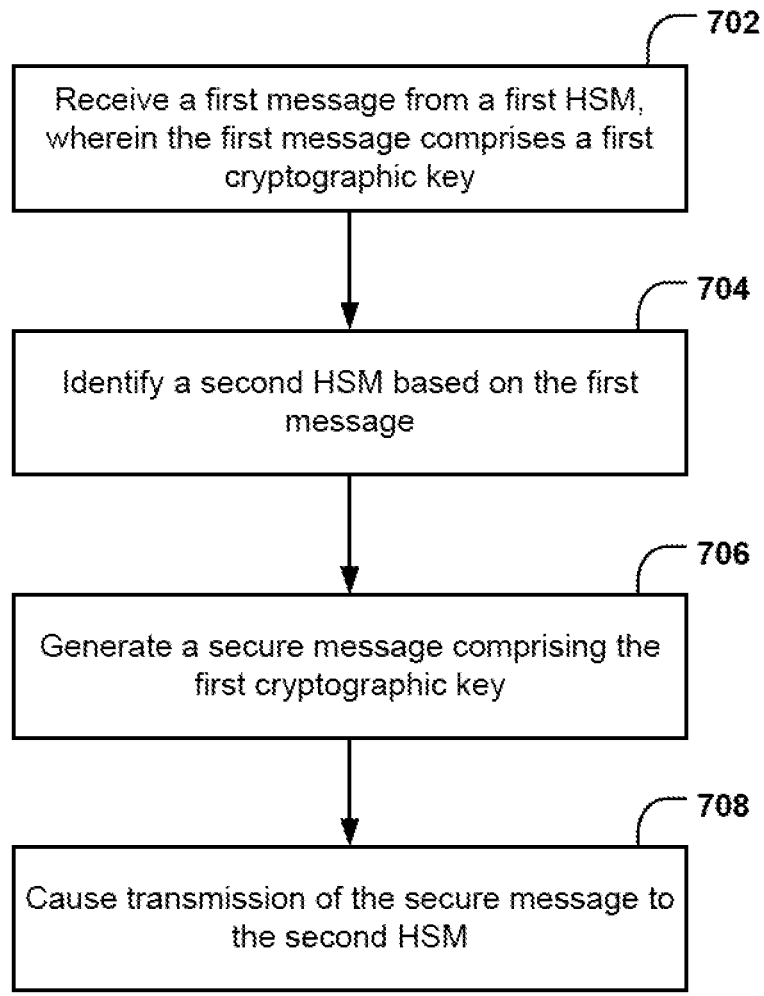
FIG. 7 illustrates an example flowchart for HSM communication management, in accordance with some example embodiments described herein.
Figure 8:
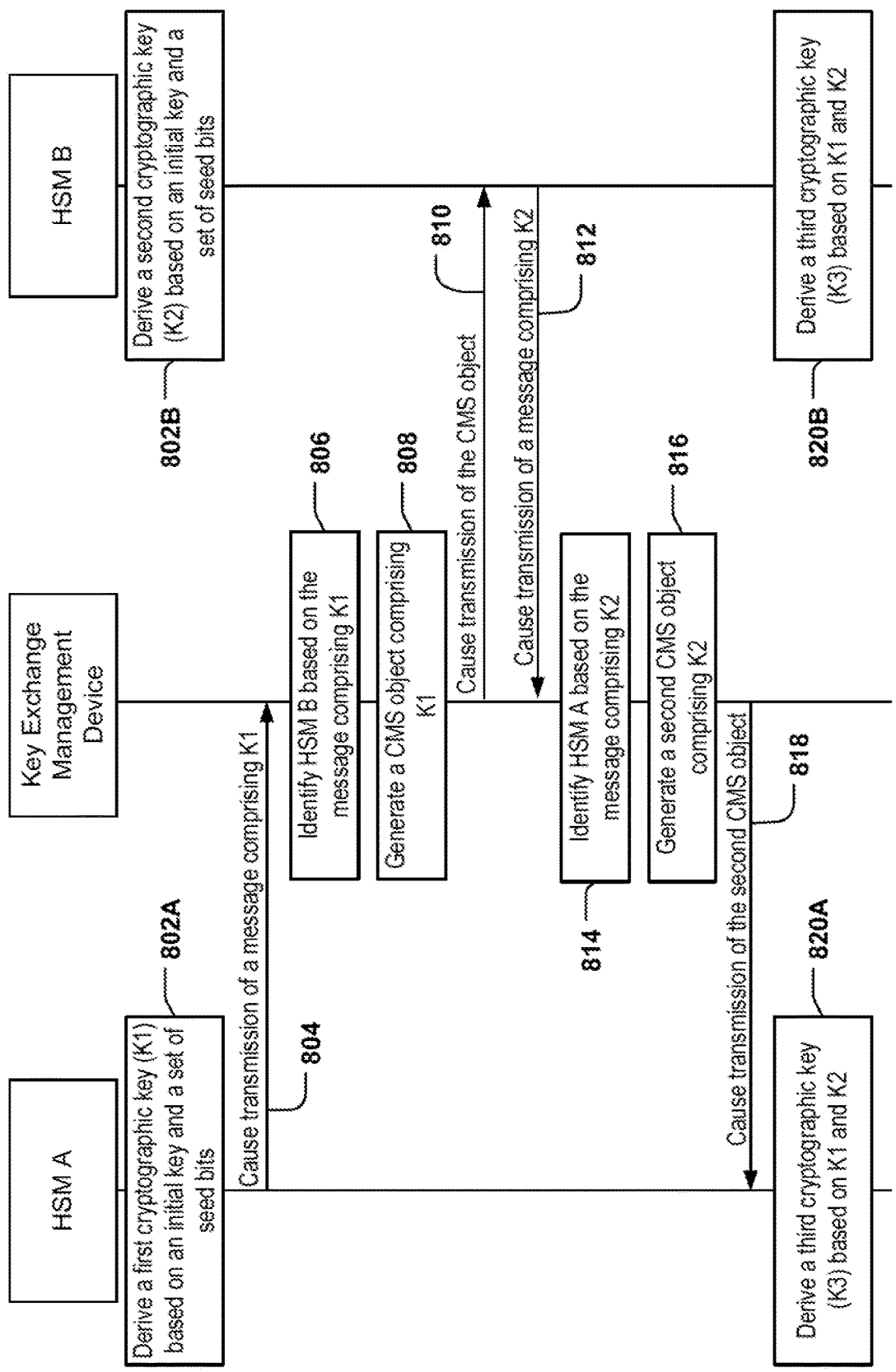
FIG. 8 illustrates an example swim lane diagram for HSM communication management, in accordance with some example embodiments described herein.

Turning to FIGS. 6-8, example flowcharts and a swim lane diagram are illustrated that contain example operations implemented by example embodiments described herein. The operations illustrated in FIG. 6 may, for example, be performed by system device 204A of the first HSM 202A shown in FIG. 2, which may in turn be embodied by an apparatus 300, which is shown and described in connection with FIG. 3. To perform the operations described below, the apparatus 300 may utilize one or more of processor 302, memory 304, communications hardware 306, input-output circuitry 308, key derivation circuitry 310, data protection circuitry 312, secure key generator 314, and/or any combination thereof. It will be understood that any user interaction with the first HSM 202A may occur directly via input-output circuitry 308, or may instead be facilitated by a separate client device or the like, and which may have similar or equivalent physical componentry facilitating such user interaction.

Turning first to FIG. 6, example operations are shown for HSM communication management.

As shown by operation 602, the apparatus 300 includes means, such as processor 302, memory 304, key derivation circuitry 310, or the like, for deriving a first cryptographic key based on an initial key and a first set of seed bits.

The initial key may be obtained by the HSM in a variety of ways. As described above in connection with FIG. 1B, in some embodiments, a first HSM may receive a quantum particles set (e.g., via QKD) from, for example, a key distribution device 210. In some embodiments, QKD may be performed in accordance with the BB84 protocol (e.g., using non-entangled photons) or the E91 protocol (e.g., using entangled photons). In this regard, in some embodiments, the first HSM (and a second HSM) may be quantum-enabled (e.g., comprise a secure key generator 314 such that the HSMs are able to receive and process quantum (entangled) particles). In such embodiments, the HSMs may instead each receive an entangled particles set (e.g., via a direct connection (e.g., a fiber optic or laser connection) with a key distribution device 210 such as an MQKD device). The first and second HSMs may each then measure their respective particle(s) to each generate the initial key. In this regard, the apparatus 300 includes means, such as processor 302, memory 304, secure key generator 314, or the like, for generating the initial key prior to deriving the first cryptographic key. To do so, the HSM may receive a quantum particles set (and a second HSM may receive a corresponding (entangled) quantum particles set). In this regard, the apparatus 300 includes means, such as processor 302, memory 304, communications hardware 306, and/or the like, for receiving a quantum particles set. The first HSM (and second HSM) may then measure the quantum particles of the quantum particles set to obtain the initial key. In this regard, the apparatus 300 includes means, such as processor 302, memory 304, secure key generator 314, or the like, for deriving the initial key based on the quantum particles set. It is to be appreciated that in some embodiments, more than two streams of entangled particles may be generated. For example, three or more streams of entangled particles may be generated and transmitted to three or more devices for generating an initial key.

Alternatively, the initial key may be generated leveraging quantum phenomena and subsequently distributed to the HSM. In this regard, a quantum particles set may be generated and measured to establish the initial key, and the initial key may then be distributed to the first HSM via a key distribution device 210. In some embodiments, the initial key may be received via a direct connection between the key distribution device 210 and the first HSM (e.g., HSM 202A). Additionally, a second HSM (e.g., HSM 202B) may also receive the initial key via a separate direct connection to the key distribution device 210.

In order to generate the first symmetric key, in addition to obtaining an initial key, the HSM may also obtain a first set of seed bits. In this regard, the apparatus 300 includes means, such as processor 302, memory 304, communications hardware 306, or the like, for receiving a first set of seed bits. In some embodiments, the first set of seed bits may comprise a truly random number (e.g., a random string of bits (e.g., a string of binary zeroes and ones)). The random number may be generated using a QRNG.

In some embodiments, the first set of seed bits may be received by the first HSM and at least one additional HSM (e.g., an HSM which has also obtained the initial key). In this regard, the first set of seed bits may be generated by and received from a bit generation device 212 (e.g., via random number generator circuitry 410, as discussed above in connection with FIG. 4). In some embodiments, the first set of seed bits may be transmitted to the first HSM (and one or more additional HSMs) in response to a request from at least one of the HSMs. For instance, upon obtaining the initial key, the first HSM may cause transmission of a request for the first set of seed bits to a quantum random number generator entity (e.g., the bit generation device 212). In this regard, the apparatus 300 includes means, such as processor 302, memory 304, communications hardware 306, or the like, for causing transmission of a request for a set of seed bits. The request may include an indication of the HSM(s) (e.g., a device and/or network identifier or the like) to which the first set of seed bits should be transmitted. For example, the first HSM may send a request to the bit generation device 212 requesting a first set of seed bits be transmitted to the first HSM and a second HSM (e.g., an HSM within a same cloud environment of the first HSM), for example, in order to begin establishment of a communication group that includes the HSMs.

Upon obtaining the initial key and the first set of seed bits, the first HSM may derive the first symmetric key. The first symmetric key may be derived using a key derivation function (KDF) that uses the initial key and the first set of seed bits as inputs to the KDF. In some embodiments, a second HSM having also obtained the initial key (e.g., via QKD as described above) and the first set of seed bits may also derive the first symmetric key. In some embodiments, deriving the first cryptographic key may establish a first communication group comprising the first HSM and the second HSM based on the second HSM having also derived the first cryptographic key.

Each of the HSMs (e.g., the first HSM and the second HSM) may use the same KDF (e.g., a first KDF) to derive the symmetric key using the initial key and the first set of seed bits. In this regard, the particular KDF used by each of the HSMs may be predetermined, e.g., in a prior agreement between the HSMs and/or predetermined by a service provider hosting the HSMs.

As shown by operation 604, the apparatus 300 includes means, such as processor 302, memory 304, communications hardware 306, or the like, for receiving a secure message comprising a second cryptographic key from a key exchange management device. In some embodiments, the second cryptographic key may be associated with an HSM hosted by a different service provider than the first HSM. In some embodiments, the second cryptographic key may be associated with a second communication group comprising multiple HSMs. The multiple HSMs may be hosted by a different service provider than the HSMs of the first communication group (e.g., the first HSM and second HSM). The second cryptographic key may have been derived in a similar manner to the derivation of the first cryptographic key (e.g., using another initial key and another set of seed bits).

The secure message comprising the second cryptographic key may comprise a CMS object. In this regard, an HSM associated with the second cryptographic key may have caused transmission of the second cryptographic key to the key exchange management device in order to facilitate distribution of the second cryptographic key to the first HSM. Upon receiving the second cryptographic key, the key exchange management device may have generated the secure message in the form of a CMS object and subsequently caused transmission of the secure message to the first HSM (and, in some embodiments, one or more additional HSMs associated with the first HSM). The CMS object is generated such that the second cryptographic key may be obtained by the first HSM regardless of the type of key exchange/management protocols and/or algorithms (e.g., Rivest-Shamir-Adleman (RSA) algorithm, Diffie-Hellman key exchange, elliptic-curve cryptography (ECC), and/or the like) implemented in the cloud environment in which the first HSM is deployed. In this regard, the CMS object may be cloud infrastructure-agnostic in that an HSM can obtain the second cryptographic key regardless of specific protocols or the like implemented by the HSM and/or the environment hosting the HSM.

In some embodiments, the secure message may comprise indications of additional HSM(s) intended to also receive the second cryptographic key. For example, rather than the key exchange management device 102 forwarding the secure message to multiple HSMs, the key exchange management device 102 may cause transmission of the secure message to the first HSM, and the first HSM itself may instead forward the secure message to the additional HSM(s) indicated in the secure message. For example, the secure message may be transmitted to the first HSM 202A and comprise an indication (e.g., a device identifier, network address, and/or the like) of the second HSM 202B that is associated with the first HSM (e.g., being in the same communication group, hosted by the same service provider, and/or the like). The first HSM, upon receiving the secure message, may cause transmission of the secure message to the second HSM 202B, such that the second cryptographic key included in the secure message can also be obtained by the second HSM 202B. In this regard, the apparatus 300 includes means, such as processor 302, memory 304, communications hardware 306, or the like, for causing transmission, in response to receiving the secure message comprising the second cryptographic key. Thus, additionally in some embodiments, the secure message may be received by the first HSM from another HSM associated with the first HSM (e.g., within a communication group), rather than directly from the key exchange management device as described in operation 604. In some embodiments, for additional security, the first HSM may encrypt the secure message using the first cryptographic key prior to causing transmission of the secure message to the additional HSM(s). The additional HSM(s), upon receiving the encrypted secure message, may then decrypt the encrypted secure message using the first cryptographic key.

In some embodiments, the first HSM may cause transmission of the first cryptographic key to the key exchange management device 102 in order to facilitate distribution of the first cryptographic key to the HSM (and, in some embodiments, one or more additional HSMs) associated with the second cryptographic key. In this regard, as shown in operation 606, the 300 includes means, such as processor 302, memory 304, communications hardware 306, or the like, for causing transmission of a message comprising the first cryptographic key to the key exchange management device. The message comprising the first cryptographic key may be transmitted over a secure protocol such as TLS or the like. In some embodiments, the key exchange management device 102 may then generate a secure message (e.g., a CMS object) comprising the first cryptographic key and cause transmission of the secure message to HSM(s) associated with the second cryptographic key (e.g., HSM(s) of a second communication group and/or HSMs hosted by a different service provider and/or deployed in a second cloud environment).

As shown by operation 608, the apparatus 300 includes means, such as processor 302, memory 304, key derivation circuitry 310, or the like, for deriving a third cryptographic key based on the first cryptographic key and the second cryptographic key. In this regard, once the HSMs have exchanged the first and second cryptographic keys via the key exchange management device and each HSM possesses both the first cryptographic key and the second cryptographic key, each HSM may then derive the third cryptographic key.

In some embodiments, the third cryptographic key may be derived using a KDF different from the KDF used to derive the first (or second) cryptographic key. For example, to derive the third cryptographic key, the HSMs may use a predetermined KDF e.g., in a prior agreement between the HSMs and/or predetermined by multiple service providers hosting the HSMs. By utilizing the key exchange management device 102 to exchange cryptographic keys between HSMs hosted by different and/or belong to different communication groups, a shared key (e.g., the third cryptographic key) can be derived such that all HSMs obtain the same key.

In some embodiments, once the third symmetric key has been derived at each of the HSMs, the HSMs may then begin securely communicating with each other using the symmetric key. In this regard, as shown by operation 610, the apparatus 300 includes means, such as processor 302, memory 304, data protection circuitry 312, or the like, for performing one or more cryptographic data protection actions using the third cryptographic key. In this regard, by each device deriving the same symmetric key, this establishes a communication group comprising the first HSM and the additional HSMs having derived the third cryptographic key.

Turning to FIG. 7, example operations are shown for HSM communication management. The operations illustrated in FIG. 7 may, for example, be performed by a key exchange management device 102 shown in FIG. 2, which may in turn be embodied by an apparatus 500, which is shown and described in connection with FIG. 5. To perform the operations described below, the apparatus 500 may utilize one or more of processor 502, memory 504, communications hardware 506, input-output circuitry 508, message circuitry 510, and/or any combination thereof. It will be understood that any user interaction with the key exchange management device 102 may occur directly via input-output circuitry 508, or may instead be facilitated by a separate client device or the like, and which may have similar or equivalent physical componentry facilitating such user interaction.

As shown by operation 702, the apparatus 500 includes means, such as processor 502, memory 504, communications hardware 506, or the like, for receiving a first message from a first HSM, wherein the first message comprises a first cryptographic key. The first message may be transmitted to the key exchange management device using a secure communication protocol such as TLS or the like. The first cryptographic key may be associated with a first communication group comprising multiple HSMs including the first HSM. The first message may be transmitted to the key exchange management device 102 in order to facilitate distribution of the first cryptographic key to a second HSM (e.g., an HSM not associated with the first communication group). For example, the second HSM may be hosted by a different service provider than the first HSM.

As shown by operation 704, the apparatus 500 includes means, such as processor 502, memory 504, message circuitry 510, or the like, for identifying a second HSM based on the first message. For example, the first message may include identifiers of one or more HSMs to which the first cryptographic key should be provided. The key exchange management device may analyze the first message and identify a second HSM as the intended recipient of the first cryptographic key.

As shown by operation 706, the apparatus 500 includes means, such as processor 502, memory 504, message circuitry 510, or the like, for generating a secure message comprising the first cryptographic key. As noted above, generating the secure message may comprise generating a CMS object containing the first cryptographic key. The CMS object is generated such that the first cryptographic key may be obtained by the second HSM regardless of the type of key exchange/management protocols and/or algorithms implemented in the cloud environment in which the second HSM is deployed.

As shown by operation 708, the apparatus 500 includes means, such as processor 502, memory 504, communications hardware 506, or the like, for causing transmission of the secure message to the second HSM. In this regard, a CMS object comprising the first cryptographic key may be transmitted to the second HSM. In some embodiments, the first message may indicate multiple HSMs, in which cause the CMS object may be transmitted to the multiple HSMs.

Additionally, in some embodiments, the key exchange management device may also receive a second message from the second HSM that includes a second cryptographic key. The second message may be transmitted to the key exchange management device using a secure communication protocol such as TLS or the like. The second cryptographic key may be associated with a second communication group comprising multiple HSMs including the second HSM. The second message may be transmitted to the key exchange management device 102 in order to facilitate distribution of the second cryptographic key to the first HSM (and, in some embodiments, one or more additional HSMs associated with the first HSM). In this regard, the apparatus 500 includes means, such as processor 502, memory 504, communications hardware 506, or the like, for receiving a second message from a second HSM, wherein the second message comprises a second cryptographic key.

The apparatus 500 also includes means, such as processor 502, memory 504, message circuitry 510, or the like, for identifying the first HSM based on the second message. For example, the second message may include identifiers of one or more HSMs to which the second cryptographic key should be provided. The key exchange management device may analyze the second message and identify the first HSM as the intended recipient of the first cryptographic key.

The apparatus 500 also includes means, such as processor 502, memory 504, message circuitry 510, or the like, for generating a secure message (e.g., a CMS object) comprising the second cryptographic key. The apparatus 500 includes means, such as processor 502, memory 504, communications hardware 506, or the like, for causing transmission of the secure message to the first HSM. In this regard, a CMS object comprising the second cryptographic key may be transmitted to the first HSM. In some embodiments, the second message may indicate multiple HSMs, in which cause the CMS object may be transmitted to the multiple HSMs.

FIG. 8 shows a swim lane diagram illustrating example operations (e.g., as described above in connection with FIGS. 6 and 7) performed by components of the environment depicted in FIG. 2 to product various benefits from example embodiments. In these figures, operations performed by a first HSM are shown along the line extending from the box labeled "HSM A," operations performed by a second HSM are shown along the line extending from the box labeled "HSM B," and operations performed by a key exchange management device 102 are shown along the line extending from the box labeled "key exchange management device." In some embodiments, HSM A and HSM B may each be deployed in different cloud environments (e.g., hosted by different service providers), although that is not necessary in every embodiment. Generally, the operations are ordered temporally with respect to one another. However, it will be appreciated that the operations may be performed in other orders from those illustrated herein.

At operation 802A, HSM A derives a first cryptographic key (K1) based on an initial key and a set of seed bits. Similarly, at operation 802B, HSM B derives a second cryptographic key (K2) based on an initial key and a set of seed bits. At operation 804, HSM A causes transmission of a message comprising K1 to the key exchange management device. The key exchange management device then analyzes the message and identifies HSM B based on the message comprising K1 at operation 806. At operation 808, the key exchange management device generates a CMS object comprising K1. At operation 810, the key exchange management device causes transmission of the CMS object comprising K1 to HSM B. At operation 812, HSM B causes transmission of a message comprising K2 to the key exchange management device. At operation 814, the key exchange management device analyzes the message and identifies HSM A based on the message comprising K2. At operation 816, the key exchange management device generates a second CMS object comprising K2. At operation 818, the key exchange management device causes transmission of the second CMS object to HSM A. At operation 820A, HSM A derives a third cryptographic key (K3) using K1 and K2 as inputs to a KDF. Similarly, at operation 820B, HSM B derives K3 using K1 and K2 as inputs to the KDF.

For ease of description, FIG. 8 illustrates that HSM B is identified based on the message from HSM A, and that HSM A is identified based on the message from HSM B. However, HSM A may be a member in a communication group of HSMs sharing K1, so it is not strictly necessary that HSM A is the recipient of the second CMS object (for instance, an HSM C that is in the communication group with HSM A may receive the second CMS object, and may in turn convey the second CMS object (or K3) to HSM A). Similarly, HSM B may be a member in a communication group of HSMs sharing K2, so it is not strictly necessary that HSM B is the HSM that causes transmission of the message comprising K2 that prompts delivery of the second CMS object (for instance, an HSM D that is in the communication group with HSM B may cause transmission of the message comprising K2).

Using the example operations shown in FIG. 8, by establishing a shared key (K3) at HSMs of two separate cloud environment, an example user is enabled to efficiently migrate an application between cloud environments. For example, a user having a deployed application in a first cloud environment utilizing HSM A and K1 may now instruct their application to instead use K3 to protect data associated with the application. Since both HSM A and HSM B now possess K3, the user may efficiently migrate their application to a second cloud environment associated with HSM B while avoiding the need to manage multiple cryptographic keys.

As described above, example embodiments provide methods and apparatuses that enable HSM communication management. Example embodiments thus provide tools that overcome the problems traditionally faced when managing keys among groups of HSMs that may be deployed in separate cloud environments by different service providers. Example embodiments decrease operational overhead, costs, and the likelihood of security issues that would traditionally exist when having to manage multiple keys for applications utilizing HSMs deployed in multiple cloud environments. Moreover, by leveraging a lightweight and easily transmissible set of seed bits to generate new symmetric keys for groups of HSMs as needed, embodiments described herein enable secure communication between HSMs to be maintained even in times of intermittent connections or low bandwidth environments.

FIGS. 6-8 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. A method for hardware security module (HSM) communication management comprising:
   deriving, by key derivation circuitry of a first HSM, a first cryptographic key based on an initial key and a first set of seed bits, wherein deriving the first cryptographic key establishes a first communication group comprising the first HSM and a second HSM based on the second HSM having also derived the first cryptographic key;
   receiving, by communications hardware of the first HSM, a secure message comprising a second cryptographic key from a key exchange management device, wherein the second cryptographic key is associated with a second communication group comprising a third HSM and a fourth HSM;
   deriving, by the key derivation circuitry of the first HSM, a third cryptographic key based on the first cryptographic key and the second cryptographic key, wherein deriving the third cryptographic key establishes a third communication group comprising the first HSM, the second HSM, the third HSM, and the fourth HSM based on the second HSM, the third HSM, and the fourth HSM having also derived the third cryptographic key; and
   performing, by data protection circuitry of the first HSM, a first cryptographic data protection action using the third cryptographic key, wherein the first cryptographic data protection action facilitates secure communication between HSMs of the third communication group.

2. The method of claim 1, further comprising:
   generating, by a secure key generator of the first HSM, the initial key prior to deriving the first cryptographic key, wherein generating the initial key comprises:
      receiving, by the communications hardware of the first HSM, a quantum particles set; and
      deriving, by the secure key generator of the first HSM, the initial key based on the quantum particles set.

3. The method of claim 1, wherein the first set of seed bits comprises a truly random number generated by a quantum random number generator (QRNG).

4. The method of claim 1, further comprising:
   causing transmission, by the communications hardware of the first HSM, of a message comprising the first cryptographic key to the key exchange management device, wherein causing transmission of the first cryptographic key to the key exchange management device facilitates a distribution of the first cryptographic key to at least one of the third HSM and the fourth HSM.

5. The method of claim 1, wherein the secure message is a cryptographic message syntax (CMS) object.

6. The method of claim 1, wherein the first HSM and the second HSM are hosted by a first service provider, and wherein the third HSM and the fourth HSM are hosted by a second service provider different from the first service provider.

7. The method of claim 1, wherein the key derivation circuitry of the first HSM derives the first cryptographic key using a first key derivation function (KDF), and wherein the key derivation circuitry of the first HSM derives the third cryptographic key using a second KDF different from the first KDF.

8. The method of claim 1, further comprising, in response to receiving the secure message comprising the second cryptographic key from the key exchange management device:
   causing transmission, by the communications hardware of the first HSM, of the secure message to at least one additional HSM associated with the first communication group.

9. An apparatus for hardware security module (HSM) communication management, the apparatus comprising a first HSM and including:
   key derivation circuitry configured to derive a first cryptographic key based on an initial key and a first set of seed bits, wherein deriving the first cryptographic key establishes a first communication group comprising the first HSM and a second HSM based on the second HSM having also derived the first cryptographic key; and
   communications hardware configured to receive a secure message comprising a second cryptographic key from a key exchange management device, wherein the second cryptographic key is associated with a second communication group comprising a third HSM and a fourth HSM,
   wherein the key derivation circuitry is further configured to derive a third cryptographic key based on the first cryptographic key and the second cryptographic key, wherein deriving the third cryptographic key establishes a third communication group comprising the first HSM, the second HSM, the third HSM, and the fourth HSM based on the second HSM, the third HSM, and the fourth HSM having also derived the third cryptographic key, and
   wherein the apparatus further comprises data protection circuitry configured to perform a first cryptographic data protection action using the third cryptographic key, wherein the first cryptographic data protection action facilitates secure communication between HSMs of the third communication group.

10. The apparatus of claim 9, further comprising a secure key generator configured to generate the initial key prior to deriving the first cryptographic key by:
   receiving, via the communications hardware, a quantum particles set; and
   deriving the initial key based on the quantum particles set.

11. The apparatus of claim 9, wherein the first set of seed bits comprises a truly random number generated by a quantum random number generator (QRNG).

12. The apparatus of claim 9, wherein the communications hardware is further configured to cause transmission of a message comprising the first cryptographic key to the key exchange management device, wherein causing transmission of the first cryptographic key to the key exchange management device facilitates a distribution of the first cryptographic key to at least one of the third HSM and the fourth HSM.

13. The apparatus of claim 9, wherein the secure message is a cryptographic message syntax (CMS) object.

14. The apparatus of claim 9, wherein the first HSM and the second HSM are hosted by a first service provider, and wherein the third HSM and the fourth HSM are hosted by a second service provider different from the first service provider.

15. The apparatus of claim 9, wherein the key derivation circuitry derives the first cryptographic key using a first key derivation function (KDF), and wherein the key derivation circuitry of the first HSM derives the third cryptographic key using a second KDF different from the first KDF.

16. The apparatus of claim 9, wherein the communications hardware is further configured to, in response to receiving the secure message comprising the second cryptographic key from the key exchange management device, cause transmission of the secure message to at least one additional HSM associated with the first communication group.

17. A computer program product for hardware security module (HSM) communication management, the computer program product comprising at least one non-transitory computer-readable storage medium storing software instructions that, when executed, cause a first HSM to:

derive a first cryptographic key based on an initial key and a first set of seed bits, wherein deriving the first cryptographic key establishes a first communication group comprising the first HSM and a second HSM based on the second HSM having also derived the first cryptographic key;

receive a secure message comprising a second cryptographic key from a key exchange management device, wherein the second cryptographic key is associated with a second communication group comprising a third HSM and a fourth HSM;

derive a third cryptographic key based on the first cryptographic key and the second cryptographic key, wherein deriving the third cryptographic key establishes a third communication group comprising the first HSM, the second HSM, the third HSM, and the fourth HSM based on the second HSM, the third HSM, and the fourth HSM having also derived the third cryptographic key; and perform a first cryptographic data protection action using the third cryptographic key, wherein the first cryptographic data protection action facilitates secure communication between HSMs of the third communication group.

18. The computer program product of claim 17, wherein the software instructions, when executed, further cause the first HSM to:

generate the initial key prior to deriving the first cryptographic key by:
receiving a quantum particles set; and
deriving the initial key based on the quantum particles set.

19. The computer program product of claim 17, wherein the first set of seed bits comprises a truly random number generated by a quantum random number generator (QRNG).

20. The computer program product of claim 17, wherein the software instructions, when executed, further cause the first HSM to:

cause transmission of a message comprising the first cryptographic key to the key exchange management device, wherein causing transmission of the first cryptographic key to the key exchange management device facilitates a distribution of the first cryptographic key to at least one of the third HSM and the fourth HSM.

* * * * *